US005857650A

United States Patent [19]

Lin

[11] Patent Number: 5,857,650

[45] Date of Patent: Jan. 12, 1999

[54] EXTENSION FOR ADJUSTABLE LEG AND METHOD OF USING

[76] Inventor: Joe Lin, 4114 King Cotton La., Missouri-city, Tex. 77459

[21] Appl. No.: 861,708

[22] Filed: May 22, 1997

[51] Int. Cl.[6] .......... F16M 11/26

[52] U.S. Cl. .......... 248/188.5

[58] Field of Search .......... 248/188.5, 188.2, 248/188.3; 403/109; 108/147

[56] References Cited

U.S. PATENT DOCUMENTS

| | | | |
|---|---|---|---|
| 3,294,440 | 12/1966 | Broder | 248/188.5 X |
| 3,604,734 | 9/1971 | Friedman | 403/109 X |
| 4,385,849 | 5/1983 | Crain | 403/109 |
| 4,569,516 | 2/1986 | Masterson | 272/70.1 |
| 4,645,161 | 2/1987 | Collins | 248/439 |
| 4,648,652 | 3/1987 | Van Kuren | 297/159 |
| 4,756,386 | 7/1988 | Blanchard | 182/153 |
| 4,776,545 | 10/1988 | Miyamoto | 248/558 |
| 5,368,126 | 11/1994 | Woodward et al. | 182/152 |
| 5,421,272 | 6/1995 | Wilmore | 108/115 |
| 5,513,825 | 5/1996 | Gutgsell | 248/188.5 |
| 5,570,968 | 11/1996 | Sassmannshausen et al. | 248/188.5 X |

*Primary Examiner*—Ramon O. Ramirez

[57] ABSTRACT

This invention provides an extension comprising a first and second side wall each having an aperture, a back wall extending between the first side wall and the second side wall, a spring-loaded releasable lock positioned adjacent to the apertures of the side walls and two retaining posts attached to the back wall near and below the releasable lock. The releasable lock includes a pair of side pins that are each inserted from the corresponding aperture in the first and second side wall into a hole in an adjustable leg of the workpiece. The extension is slid up and down the adjustable leg when the side pins of the releasable lock are moved out of the holes of the adjustable leg and the releasable lock is retained downwards between the retaining posts of the extension. The method of application of the extension to adjustable legs of workpieces is also described.

13 Claims, 5 Drawing Sheets

EXTENSION FOR ADJUSTABLE LEG AND METHOD OF USING

BACKGROUND OF THE INVENTION

1. Field of the Invention

This invention relates to an extension for adjustable legs used in stilts, benches and other similar devices.

2. Description of the Prior Art

A wide variety of devices have been designed for extending or diminishing lengths and heights of apparatus such as stilts and benches. As examples, several patents that have been issued in the past few decades follow:

Woodward et al., U.S. Pat. No. 5,368,126, issued on Nov. 29, 1994, patents an adjustable work platform that can be adjusted vertically and that has foldable leg assemblies. The adjustment of the height of the work platform is done by moving the leg assemblies, versus independent extensions for leg assemblies, upwards or downwards through slideable collars of the work platform and positioning a securing pin within the desired aperture in each leg assembly.

Miyamoto, U.S. Pat No. 4,776,545, issued on Oct. 11, 1988, patents a bisymmetric bench stand with two main legs and a pair of cross-linked flat bars. The top ends of the bench stand can be bolted to any of a series of bolt holes in the main legs. The bottom ends of the bench stand are bolted to the main legs. The middles of the flat bars are screwed together at a series of positions corresponding to the bolt holes on the main legs. Height-adjustable auxiliary legs are attached to the bottom of the main legs.

Masterson, U.S. Pat. No. 4,569,516, registered on Feb. 11, 1986, patents a vertically adjustable leg for stilts that comprises upper and lower complementarily vertically slideably interfitted struts. To permit the length of the assembled struts to be readily varied, a quick-action lock is interposed between the struts.

Presently, heights of stilts and similar workpieces are generally adjusted by using quick-action locks. A channel-shaped tube is usually slid within each adjustable leg of the workpiece. The adjustable leg has several pairs of vertically-spaced, horizontally-aligned holes, with each hole being designed to receive a stop peg. A compression spring is often interposed between the stop pegs within the tube to constantly bias the stop pegs outwardly. Each lock is provided with a finger grip. The finger grips are manually urged together to retract the stop pegs from within the pair of holes of the adjustable leg and, thus, to adjust the height of the workpiece by vertical sliding movement of the channel-shaped tube within the adjustable leg of the workpiece. Although the finger grips are designed to be operated manually, considerable manual force is needed to squeeze the finger grips in order to retract the stop pegs from within the pairs of holes of the adjustable leg.

Due to the exposure of the workpieces to foreign material, such as dust, that are present at construction sites, some parts of the lock tend to bind. Because of such tendency to bind, the stop pegs do not always securely lodge themselves within the pair of holes of the adjustable leg. The loose positioning of the stop pegs within the holes of the adjustable leg may cause sudden opening of the lock and result in the fall of the workman.

A need has arisen for a lightweight channel-shaped extension that serves as a secure and accident-free means for easily, quickly and manually adjusting heights of workpieces.

SUMMARY OF THE INVENTION

A primary object of the invention is to devise an extension for adjustable legs of workpieces that is used to simply and quickly adjust heights of the workpieces manually and without the need for any tools.

Another object of this invention is to devise an extension for adjustable legs that is lightweight and easily moveable.

An additional object of this invention is to devise an extension for adjustable legs that is used to adjust and securely maintain the height of a workpiece without moving or dismantling the workpiece.

Another object of this invention is to devise an extension, for adjustable legs, that provides a stable support for a workpiece having adjustable legs.

Another object of this invention is to devise an extension for adjustable legs of a workpiece that will provide a long and accident-free service life for the workpiece.

A final object of this invention is to provide an extension for adjustable legs that is simple and economical to manufacture.

Additional objects and advantages of the invention will be set forth in part in a detailed description which follows, and in part will be obvious from the description, or may be learned by practice of the invention.

The present invention is an extension comprising a first and second side wall each having an aperture, a back wall extending between the first side wall and the second side wall, a spring-loaded releasable lock positioned adjacent to the apertures of the side walls and two retaining posts attached to the back wall near and below the releasable lock. The releasable lock includes a pair of side pins that are each inserted from the corresponding aperture in the first and second side wall into a hole in an adjustable leg of the workpiece. The extension is slid up and down the adjustable leg when the side pins of the releasable lock are moved out of the holes of the adjustable leg and the releasable lock is retained downwards between the retaining posts of the extension.

It is to be understood that the descriptions of this invention are exemplary and explanatory, but are not restrictive, of the invention. Other objects and advantages of this invention will become apparent from the following specification and from any accompanying charts, tables, examples and drawings.

BRIEF DESCRIPTION OF CHARTS, TABLES, EXAMPLES AND DRAWINGS

Any accompanying charts, tables, examples and drawings which are incorporated in and constitute a part of this specification, illustrate examples of preferred embodiments of the invention and, along with the description, serve to explain the principles of the invention.

DETAILED DESCRIPTION OF THE PREFERRED EMBODIMENT

Figure 1:
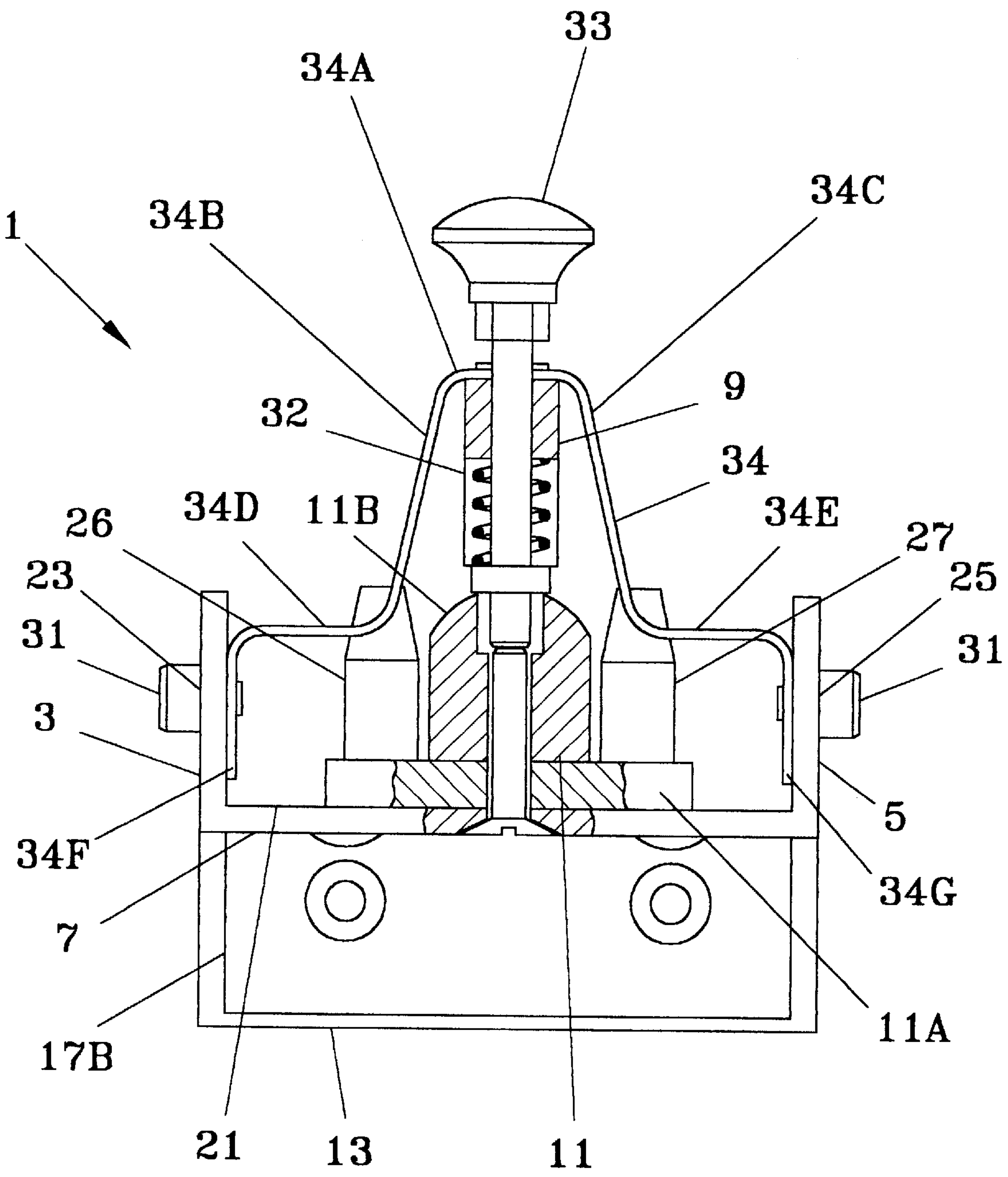
FIG. 1 shows a sectional front view of an extension for adjustment of heights of workpieces, with certain features of a releasable lock shown in more detail.

Preferred embodiments of the present invention are illustrated in any charts, tables, examples and drawings that are included.

The present invention provides an extension 1 for adjustment of heights of stilts, benches and other similar devices. (The stilts, benches and other similar devices will be referred to hereafter as "workpieces 2".) The extension 1 serves as a height-adjusting auxiliary leg that is attached to the bottom of an adjustable leg 4 of the workpiece 2. (Please note that an adjustable leg 4 is the only section of a workpiece 2 that is shown in some figures and the workpiece 2 as a whole is not demonstrated in the figures.) The adjustable legs 4 are channel-shaped and include a number of holes 8 on two opposite side walls 6. The holes 8 are aligned in pairs across the width of the adjustable leg 4 and, if more than one pair, are spaced along a chosen length of each adjustable leg 4. The height of the adjustable legs 4 and of the workpiece 2 are adjusted by positioning a pair of interlocking elements 31 (such as, and referred to for simplicity hereafter as, side pins 31) of the extension 1 within a selected pair of holes 8 of the adjustable leg 4. (Please refer to FIG. 3C.)

The extension 1 is also channel-shaped and has a first side wall 3, a second side wall 5, a back wall 7, an upper end 21, a lower end 22, a spring-loaded releasable lock 9, a lock support 11, two retaining posts 26,27 and a base 13. (Please refer to FIG. 1.) The extension 1 is open at its upper end 21 and lower end 22. The first side wall 3 and the second side wall 5 each have an aperture 23,25, respectively, near the upper end 21 of the extension 1. The back wall 7 extends between and along and is integral with the first side wall 3 and the second side wall 5. The spring-loaded releasable lock 9 is positioned adjacent to the upper end 21 of the extension 1 and between the first side wall 3 and the second side wall 5. When being used, the spring-loaded releasable lock 9 of the extension 1 snaps into engagement with the adjustable leg 4 of the workpiece 2. The releasable lock 9 serves to selectively lock the first side wall 3 and the second side wall 5 of the extension 1 to the side walls 6 of the adjustable leg 4 at different positions on the adjustable leg 4 and, thereby, adjust the height of the workpiece 2.

Figure 2:
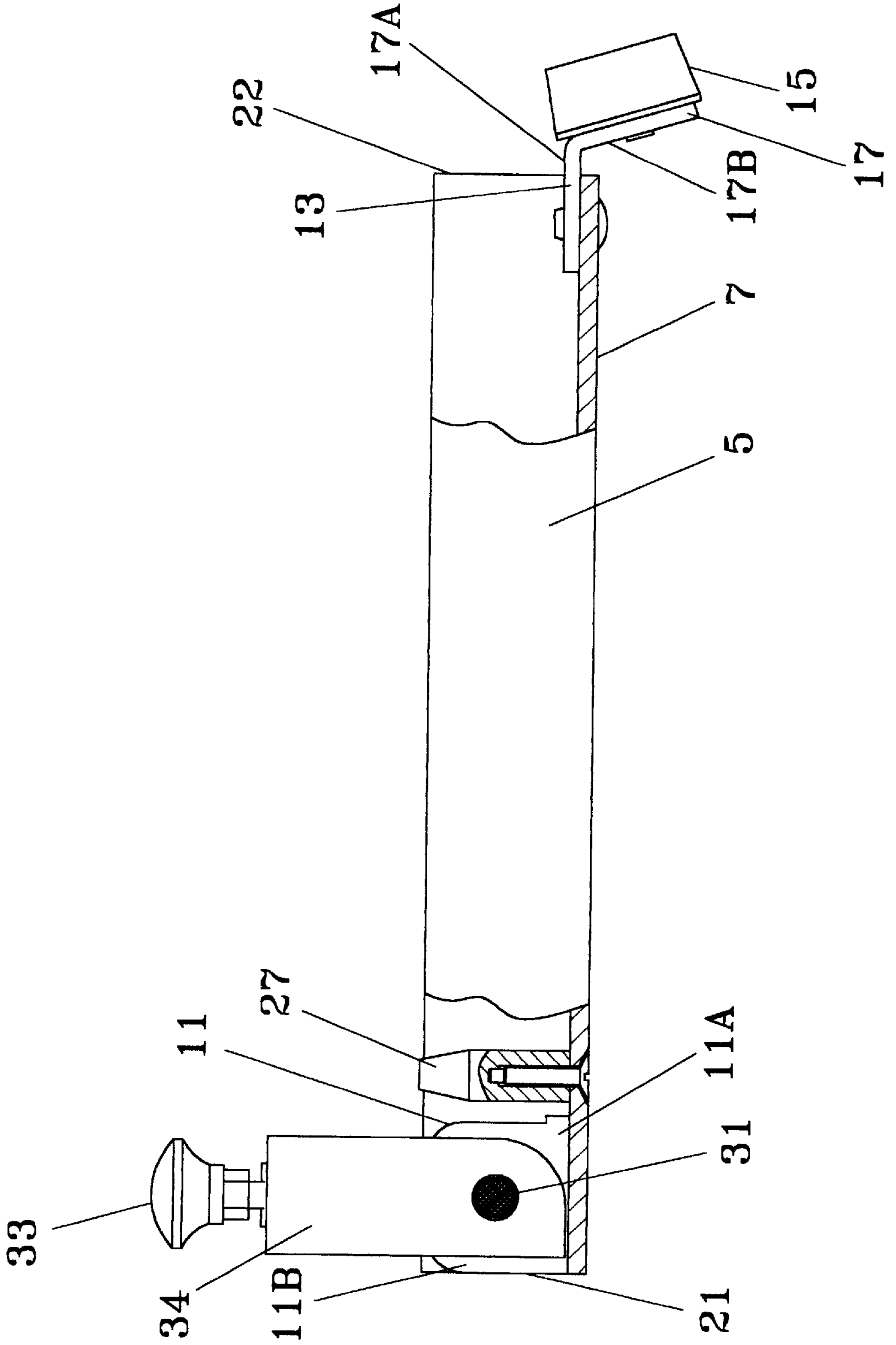
FIG. 2 is a sectional side view of the extension of FIG. 1, with certain features of an upper portion and of a lower portion shown in more detail.

The spring-loaded releasable lock 9 comprises a spring-encompassed casing 32, a capped screw 33 to be moved longitudinally within the casing 32, two side pins 31 and a wish-bone shaped finger grip 34. The finger grip 34 connects the two side pins 31 to the spring-encompassed casing 32 and is interposed between the first side wall 3 and the second side wall 5. The aperture 23 of the first side wall 3 and the aperture 25 of the second side wall 5 are each adapted to receive a side pin 31 from the spring-loaded releasable lock 9. Both retaining posts 26,27 are attached to the back wall 7 and are positioned adjacent to and immediately below the spring-loaded releasable lock 9. As shown in FIG. 2, the base 13 is attached to the back wall 7 at the lower end 22 of the extension 1.

In a preferred embodiment, the wish-bone shaped finger grip 34 has a top face 34A with a central hole, two upper downwardly-extending surfaces 34B,C, two intermediary faces 34D,E and two lower downwardly-extending surfaces 34F,G. The upper downwardly-extending surfaces 34B,C are a continuation from opposite sides of the top face 34A, with each continuation being from a side of the top face 34A that is parallel to the first and the second side wall 3,5 of the extension 1. (Please refer to FIG. 1.) The upper downwardly-extending surfaces 34B,C and the top face 34A are basically a middle portion of the finger grip 34 and are arranged almost in the shape of a "U" (referred to as "U-shaped"). The U shape of the middle portion of the finger grip 34 facilitates the engagement of the finger grip 34 between the thumb and the fore-finger of a user. Each upper downwardly-extending surface 34B,C (i.e. leg of the U-shaped middle portion) merges into a generally L-shaped support. The two L-shaped supports of the extension 1 are mirror images of one another. Each intermediary face 34D,E and the attached lower downwardly-extending surface 34F, G, respectively, form the L-shaped support, with the intermediary face 34D,E being basically parallel to the top face 34A. Each lower downwardly-extending surface 34F,G is a continuation of the corresponding intermediary face 34D,E which is, in turn, a continuation of the corresponding upper downwardly-extending surface 34B,C, respectively.

Each side pin 31 is rigidly connected to and extends away from and in a basically perpendicular direction to the corresponding lower downwardly-extending surface 34F,G of the finger grip 34. (Please refer to FIG. 1.) The lower downwardly-extending surface 34F,G has one straight external edge (i.e. not shared with the neighboring intermediary face 34D,E) that neighbors the upper end 21 of the extension 1. The remaining external edges, that are not shared with the intermediary faces 34D,E, of the lower downwardly-extending surfaces 34F,G resemble a quarter of an ellipse. The edges of each lower downwardly-extending surface 34F,G are arranged such that the straight edge is basically perpendicular to the quarterly elliptical edge at their intersection. The lower downwardly-extending surfaces 34F,G are specifically designed to avoid any movements and rotations of the finger grip 34 that are not over the surface of the back wall 7. The corner formed at the intersection of the straight edge and the quarter ellipse limits the movement of the finger grip 34: the finger grip 34 can be turned downwards only in one direction (i.e. towards the lower end 22 of the extension 1) and upwards only in the opposite direction (i.e. towards the upper end 21 of the extension 1). However, the quarterly-elliptical shape of the other edges facilitates the movement of the finger grip 34 over the back wall 7 and simplifies the inward, as well as the outward, movement of the side pins 31. (Please refer to FIG. 2.)

The lock support 11, preferably comprising a supporting plate 11A that is positioned above and attached to the back wall 7 and a supporting dome 11B that is positioned above and attached to the supporting plate 11A, is attached (preferably screwed) to the back wall 7 near the upper end 21 of the extension 1. (Please refer to FIG. 1.) An empty space exists within a portion of the supporting dome 11B. The capped screw 33 of the finger grip 34 has a tip that moves longitudinally in and out of the empty space when the capped screw 33 is moved longitudinally. Any movement of the releasable lock 9 is prevented while the tip of the capped screw 33 is within the empty space of the supporting dome 11B.

Figure 3A:
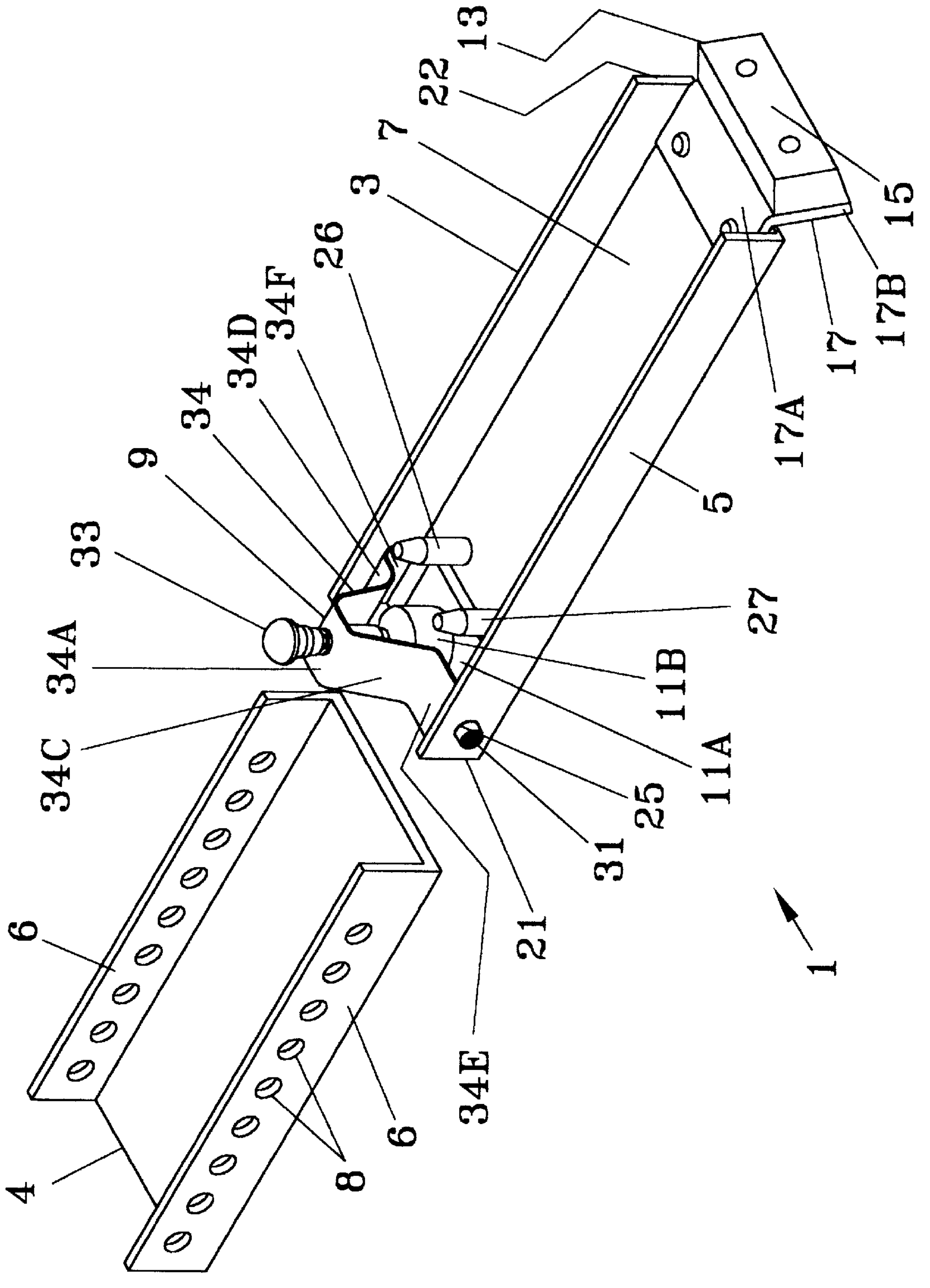
FIG. 3A shows a raised (upwardly), perspective view of the extension of FIG. 1 and an adjustable leg of a workpiece to which the extension is to be applied.

The retaining posts 26,27 are screwed to the back wall 7 below and adjacent to the supporting plate 11A. (Please refer to FIG. 3A.) The retaining posts 26,27 are positioned apart at a distance that is calculated to provide an exact fitting for the upper downwardly-extending surfaces 34B,C of the wish-bone shaped finger grip 34 in between the retaining posts 26,27. The space between the retaining posts 26,27 is specifically intended to enable the exact placement of each upper downwardly-extending surface 34B,C next to the corresponding retaining post 26,27 when the finger grip 34 is turned downwards and is laid upon the back wall 7. (Please refer to FIG. 3B.) The finger grip 34 can be turned downwards towards the lower end 22 of the extension 1 only upon moving the tip of the capped screw 33 out of the supporting dome 11B. The two retaining posts 26,27 serve to maintain the releasable lock 9 in a position to ensure that the side pins 31 of the releasable lock 9 do not move outwards, unless some upward force is exerted upon the capped screw 33, upon the casing 32 or upon the finger grip 34, until the extension 1 is placed in the desired location. Also, the two retaining posts 26,27 serve to prevent a downwardly movement of the releasable lock 9 when the releasable lock 9 is being used and the tip of the capped screw 33 is positioned within the empty space of the supporting dome 11B.

The base 13 comprises an angular metallic section 17 (having a first metallic face 17A and a second metallic face 17B) and a rubber footpad 15. (Please refer to FIG. 2.) The first metallic face 17A of the angular metallic section 17 is positioned between the first side wall 3 and the second side wall 5 and is attached, preferably being riveted, to and in parallel to the back wall 7 of the extension 1. The second metallic face 17B of the angular metallic section 17 is a continuation of the first metallic face 17A and extends backwardly preferably at a slightly-obtuse angle in relation to and is adjacent to the back wall 7 of the extension 1. Due to the fact that the first metallic face 17A is attached to and in parallel to the base 13, the first and second metallic face 17A,B are preferably at a slightly-obtuse angle in relation to each other as well. The rubber footpad 15 is attached, preferably being riveted, to the second metallic face 17B such that the rubber footpad 15 rests on the ground when the extension 1 is being used. The rubber footpad 15 is sufficiently sturdy to be capable of supporting the weight of all items that exert pressure on the extension 1. The extension 1 must have sufficient rigidity to be capable of supporting any weight and pressure exerted upon the workpiece 2. For example, the extension 1 should be sufficiently sturdy to be capable of withstanding any pressures exerted upon a bench stand and resulting from utilization of different tools by and various orientations of the user. When each extension 1 is thus set up in the operative position and is attached properly to the desired adjustable leg 4 of the workpiece 2, the workpiece 2 can be structurally stable.

For the extension 1 to fit within and lock in place within an adjustable leg 4 of the workpiece 2, the width of the extension 1 has to be minutely smaller than the width of the adjustable leg 4 to allow the sliding and snuggling of the extension 1 within the adjustable leg 4. However, in order to assure that the side pins 31 are supported horizontally and vertically and that there is no vertical force exerted on the side pins 31 when the extension 1 is set in position, the difference in width between the adjustable leg 4 and the extension 1 should be minimal. (Please refer to FIG. 3A.) The dimensions of the extension 1 are so chosen that the extension 1 can readily undergo relative sliding movement along and within the channel-shaped adjustable leg 4 with a minimal amount of pressure on the side pins 31 and with a minimal amount of wobbling. The holes 8 of the adjustable leg 4 are arranged in pairs at specific distances from the supported section of the workpiece 2. The more the number of holes 8 existing along each adjustable leg 4, the more options exist in adjusting the height of the adjustable leg 4 and of the workpiece 2. However, should an alternate height of the workpiece 2 be desired, additional holes 8 may be drilled in the adjustable legs 4. The length of the extension 1, the distance between the horizontal section of the workpiece 2 and the holes 8 of the adjustable leg 4 and the number and position of the holes 8 of each adjustable leg 4 are determinative factors in establishing the height of the workpiece 2.

Meanwhile, the application of the extension 1 is extremely simple and requires a minimal amount of time. The extension 1 is fitted to the adjustable leg 4 without the need for any screwdrivers, pliers, wrenches or other similar appliances that are regularly used for removing, positioning or adjusting extensions. Each side pin 31 simply fits into and is locked into the corresponding hole 8 of the adjustable leg 4. (Please refer to FIG. 3C.) The side pins 31 of the spring-loaded releasable lock 9 can be simply and quickly moved in and out of the holes 8 in the adjustable leg 4 manually by the user.

Figure 3B:
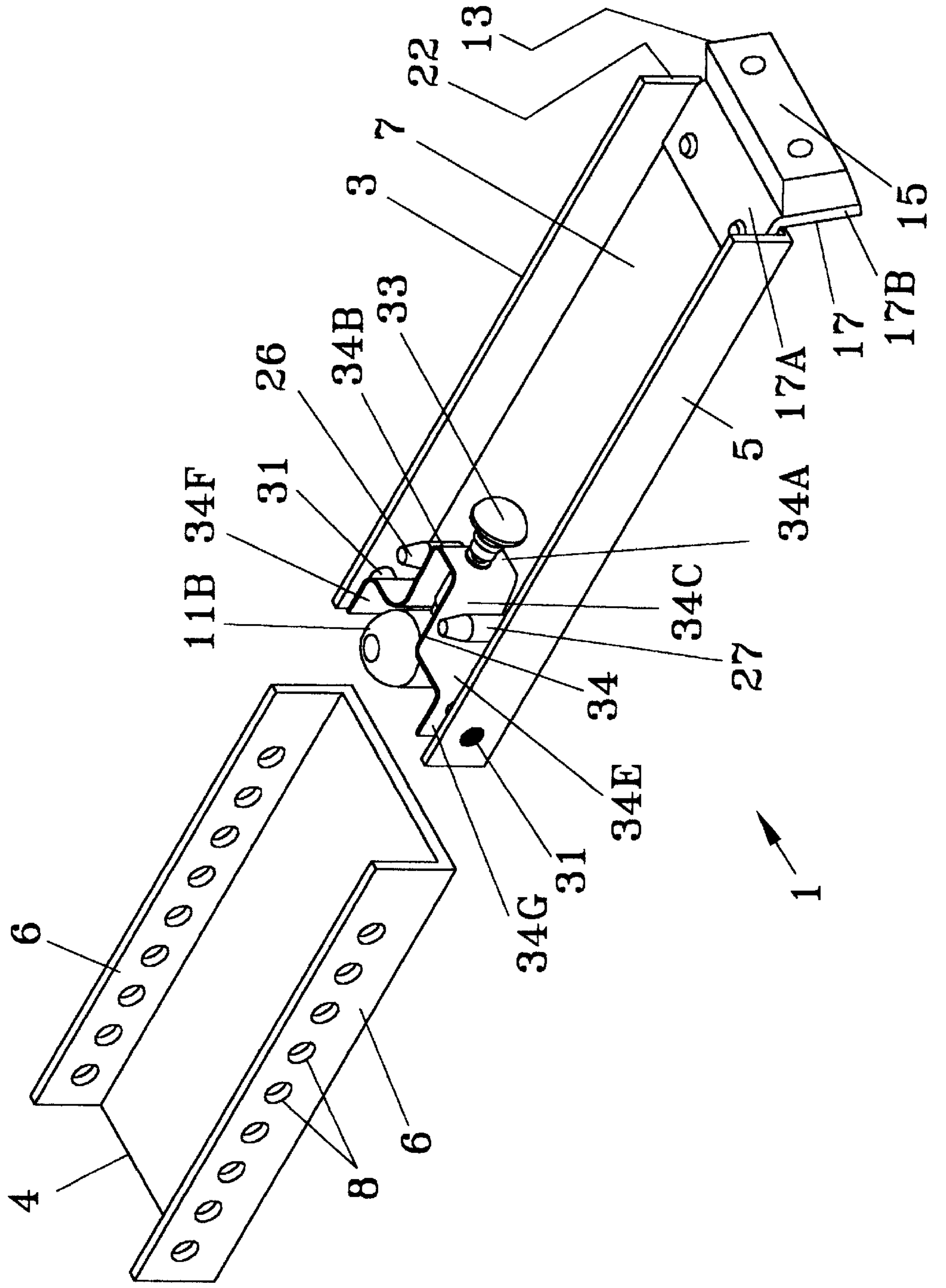
FIG. 3B shows the raised (upwardly), perspective view of the extension of FIG. 3A, while the extension is ready to be slid along the adjustable leg of the workpiece.
Figure 3C:
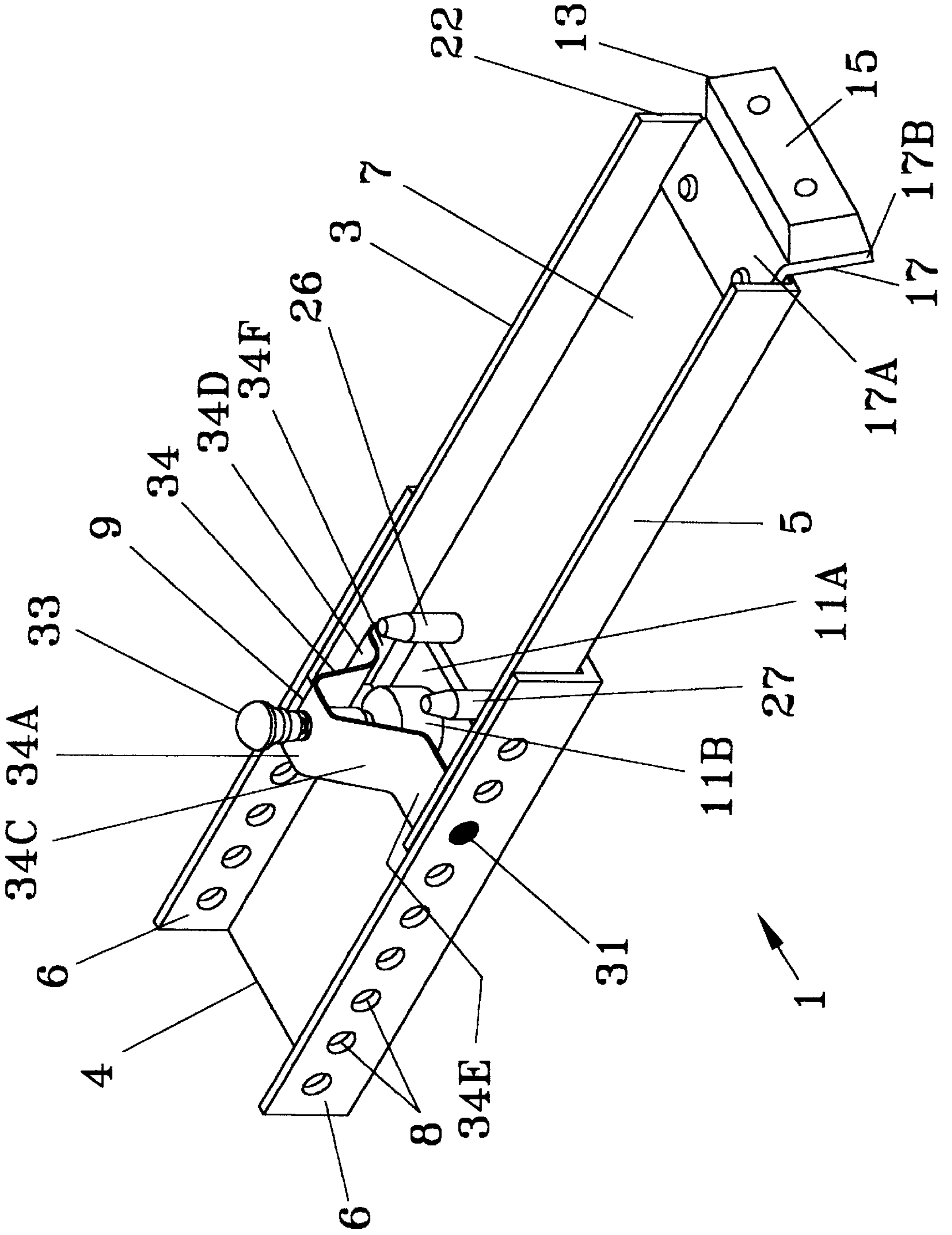
FIG. 3C shows the raised (upwardly), perspective view of the extension of FIG. 3A, while the extension is attached to the adjustable leg of the workpiece.

Adjustments of the height of the workpiece 2 are made manually with extremely simple and quick arrangements. The height of the workpiece 2 is changed by using an extension 1 of a different length or by simply moving the side pins 31 of the releasable lock 9 of the same extension 1 out of the holes 8 in the side walls 6 of the adjustable leg 4 and positioning the side pins 31 within another pair of holes 8 in the side walls 6 of the same adjustable leg 4. The releasable lock 9 is easily removed and repositioned, permitting the height of the workpiece 2 to be quickly and readily varied. In rearranging the height of the workpiece 2, an upper portion of each extension 1 is slideably fitted into a lower portion of each corresponding adjustable leg 4 of the workpiece 2 (as shown in FIG. 3C). The upper portion of the extension 1 is openly embraced by the lower portion of the corresponding adjustable leg 4 of the workpiece 2. The first side wall 3, the second side wall 5 and the back wall 7 of the extension 1 are each positioned in contact with a corresponding wall of the adjustable leg 4. The extension 1 is attached to the adjustable leg 4 by sliding the extension 1 to the desired location of the adjustable leg 4 and releasing the releasable lock 9 such that each side pin 31 jumps into the adjacent hole 8 in the side wall 6 of the adjustable leg 4. The extension 1 is removed by manually moving and disengaging the releasable lock 9 until each side pin 31 is completely out of the corresponding hole 8 in the side wall 6 of the adjustable leg 4 and by sliding the extension 1 out of the adjustable leg 4. For changing the height of the workpiece 2, each side pin 31 is removed from registration within the corresponding hole 8 of the adjustable leg 4, leaving the extension 1 free to slide along the adjustable leg 4. The height of the workpiece 2 is adjusted by sliding the extension 1 along and within the adjustable leg 4 to a desired location such that each side pin 31 is adjacent to a hole 8 of the adjustable leg 4 and, then, releasing the releasable lock 9 such that each side pin 31 is inserted into the adjacent hole 8 at the newly selected height. When the desired height of the workpiece 2 is reached, the side pins 31 of the releasable lock 9 are released and move from the apertures 23,25 in the first side wall 3 and in the second side wall 5, respectively, of the extension 1 into the chosen holes 8 in the adjustable leg 4. As a result, the extension 1 is locked within and clamped to the adjustable leg 4. (Please refer to FIG. 3C.) Upon locking the side pins 31 within the holes 8 of the adjustable leg 4, the movement of the extension 1 along the adjustable leg 4 is prevented and the height of the workpiece 2 is stably established. The extension 1 is slideably received in the adjustable leg 4 such that the adjustable leg 4 provides longitudinal bracing of at least an upper portion of the extension 1. The extension 1 is basically positioned in a co-linear relationship with the adjustable leg 4, resulting in an increase in the height of the adjustable leg 4 and of the workpiece 2.

In more detail, to rearrange the height of the workpiece 2, the spring-loaded releasable lock 9 of the extension 1 is opened by manually pulling up the capped screw 33. The capped screw 33 is then turned towards the lower end 22 of the extension 1 and pushed downwards to approach the back wall 7. When the finger grip 34 is being turned manually towards the back wall 7, the two upper downwardly-extending surfaces 34B,C of the finger grip 34 are pushed in between the retaining posts 26,27, causing the two upper downwardly-extending surfaces 34B,C of the finger grip 34 to urge together. (Please refer to FIG. 3B.) When the two upper downwardly-extending surfaces 34B,C of the finger grip 34 are urged together, the side pins 31 retract from within the holes 8 of the adjustable leg 4 to permit a sliding movement of the extension 1 along and within the adjustable leg 4. A portion of each side pin 31 moves out of the aperture 23 (and 25) in the first side wall 3 (and the second side wall 5) of the extension 1 and approaches the lock support 11 of the extension 1. The upper downwardly-extending surfaces 34B,C of the finger grip 34 slide in between and tightly fit in between the retaining posts 26,27 (as shown in FIG. 3B) and so remain while the extension 1 is being slid longitudinally upwards and downwards within the channels of the adjustable legs 4. While the finger grip 34 is retracted and remains between the retaining posts 26,27, the side pins 31 do not protrude out of the first and second side wall 3,5 of the extension 1 and, thus, allow the user to smoothly slide the extension 1 upwards and downwards within the channel of the adjustable leg 4 without needing to manually hold the capped screw 33 up and out of the supporting dome 11B. Meanwhile, the side pins 31 are restrained from completely moving inwardly out of the confines of the apertures 23,25 in the first and second side wall 3,5, respectively, of the extension 1. The supporting plate 11A of the lock support 11 limits the inward movement of the side pins 31 through the apertures 23,25 of the first and second side wall 3,5. The lower downwardly-extending surfaces 34F,G, which are attached to the side pins 31, are stopped by the supporting plate 11A. When the finger grip 34 is held between the retaining posts 26,27, the capped screw 33 does not protrude out of its casing 32 and presses against an external surface of the supporting dome 11B and, thus, the movement of the capped screw 33 is prevented. Upon reaching the desired position within the adjustable leg 4, the finger grip 34 is moved upwards (preferably while the capped screw 33 is pushed outwards), passed out of the space between the retaining posts 26,27 and repositioned upon the opening of the supporting dome 11B, such that the ending of the capped screw 33 inserts into the opening in the supporting dome 11B and such that the side pins 31 protrude out of the apertures 23,25 in the first and second side wall 3,5, respectively, and are placed in the selected holes 8 in the adjustable legs 4.

When each extension 1 is stably fit in the corresponding adjustable leg 4, the base 13 is positioned horizontally upon the ground. The attachment between the base 13 and the back wall 7 of the extension 1 is sufficiently strong to avoid any movement of the base 13. The angle between the first metallic face 17A and the second metallic face 17B of the angular metallic section 17 of the base 13 is particularly designed to provide maximal strength of the angular metallic section 17 and, thus of the base, during insertion of pressure upon the extension 1. Meanwhile, the rubber footpad 15 of the base 13 is built of a material and has a structure that are aimed at minimizing any slipping or unwanted movements of and maximizing the stability of the workpiece 2.

The extension 1 of the adjustable leg 4 is simple and economical to manufacture. To provide sufficient stability, channel steel or the like is employed for most parts of the extension 1. The simple structure of the extension 1 contributes to a simple and inexpensive construction route.

Certain objects are set forth above and made apparent from the foregoing description, drawings and examples. However, since certain changes may be made in the above description, drawings and examples without departing from the scope of the invention, it is intended that all matters contained in the foregoing description, drawings and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A channel-shaped extension for adjusting heights of workpieces that have channel-shaped adjustable legs with two opposite side walls containing aligned holes, said extension comprising:

(a) an open upper end and an open lower end;

(b) a first side wall and a second side wall, each having an aperture near the upper end of the extension;

(c) a back wall extending between and along and being integral with the first side wall and the second side wall;

(d) a spring-loaded releasable lock being positioned adjacent to the upper end of and between the first side wall and the second side wall of the extension and comprising:

i. a spring-encompassed casing, ii. a capped screw, having a tip, to be manually moved longitudinally within the spring-encompassed casing, iii. two side pins shaped to fit within the apertures in the first and second side wall of the extension and in the holes of the adjustable leg, and iv. a wish-bone shaped finger grip connecting the two side pins to the spring-encompassed casing;

(e) a lock support that is attached to the back wall near the upper end of the extension;

(f) two retaining posts attached to the back wall and positioned adjacent to and immediately below the lock support; and (g) a base attached to the back wall at the lower end of the extension; such that by manually moving the capped screw in a longitudinal direction, the side pins are moved out of the holes in the adjustable leg and the extension is free to be slid along and within the adjustable leg.

2. The extension according to claim 1, wherein the wish-bone shaped finger grip comprises:

(a) a top face with a central hole, with the capped screw passing through said central hole;

(b) two upper downwardly-extending surfaces that are continuations from opposite sides of the top face, with said opposite sides being parallel to the first and second side wall of the extension;

(c) two intermediary faces that are continuations of the corresponding upper downwardly-extending surface and that are basically parallel to the top face; and (d) two lower downwardly-extending surfaces that are each a continuation of the corresponding intermediary face, with each side pin being rigidly connected to and extending away from and in a basically perpendicular direction to the corresponding lower downwardly-extending surface of the finger grip;

such that an inwardly-oriented movement of the lower downwardly-extending surfaces causes an inwardly-oriented movement of the side pins and an outwardly-oriented movement of the lower downwardly-extending surfaces causes an outwardly-oriented movement of the side pins.

3. The extension according to claim 2, wherein each lower downwardly-extending surface has external edges that are not shared with the corresponding intermediary face, with each straight external edge neighboring the upper end of the extension and corresponding remaining external edges resembling a quarter of an ellipse, with the straight external edge and the corresponding remaining external edges intersecting to form a basically perpendicular corner, such that inward and outward movements of the side pins are facilitated, and such that the finger grip can be turned downwards only in one direction, towards the lower end of the extension, and can be turned upwards only in the opposite direction, towards the upper end of the extension, but cannot be turned over the perpendicular corner of intersection of the straight external edge with the remaining external edges.

4. The extension according to claim 2, wherein the retaining posts are positioned apart at a distance that:

provides an exact fitting for the upper downwardly-extending surfaces of the wish-bone shaped finger grip when the upper downwardly-extending surfaces of the finger grip are laid upon the back wall in between the retaining posts, and prevents any upward movement of the releasable lock and any outward movement of the side pins while the upper downwardly-extending surfaces of the wish-bone shaped finger grip are laid upon the back wall in between the retaining posts, unless some upward force is exerted upon the capped screw, upon the casing or upon the finger grip.

5. The extension according to claim 1, wherein the lock support comprises a supporting plate that is positioned above and attached to the back wall and a supporting dome that is positioned above and attached to the supporting plate, such that the tip of the capped screw is longitudinally moved in and out of some empty space that is available in a portion of the supporting dome, such that any movement of the releasable lock is prevented while the tip of the capped screw is within the empty space of the supporting dome, and such that the supporting plate limits inward movements of the side pins out of the apertures.

6. The extension according to claim 1, wherein the base comprises:

(a) an angular metallic section that includes:

i. a first metallic face being attached to and in parallel to the back wall of the extension and being positioned between the first side wall and the second side wall, and ii. a second metallic face being a continuation of the first metallic face and extending backwardly at a slightly-obtuse angle in relation to the back wall of the extension; and (b) a rubber footpad that is attached to the second metallic face;

such that the rubber footpad rests on the ground when the extension is being used.

7. A method of applying a channel-shaped extension to adjust heights of workpieces that have channel-shaped adjustable legs with two opposite side walls containing aligned holes, said extension comprising:

(a) an open upper end and an open lower end;

(b) a first side wall and a second side wall, each having an aperture near the upper end of the extension and each being slid upwards along each corresponding side wall of and within a channel-shaped adjustable leg;

(c) a back wall extending between and along and being integral with the first side wall and the second side wall;

(d) a spring-loaded releasable lock being positioned adjacent to the upper end of and between the first side wall and the second side wall of the extension and comprising:

i. a spring-encompassed casing, ii. a capped screw, having a tip, to be manually moved longitudinally within the spring-encompassed casing, with the capped screw being moved upwards when the releasable lock is to be repositioned and being moved downwards when the releasable lock has reached the desired position;

iii. two side pins shaped to fit within the apertures in the first and second side wall of the extension and in the holes of the adjustable leg, with the side pins being moved out of the holes in the side walls of the adjustable leg before the extension is free to slide along the adjustable leg, and iv. a wish-bone shaped finger grip connecting the two side pins to the spring-encompassed casing, with the side pins moving inwards when the finger grip is being turned downwards and with the side pins moving outwards when the finger grip is being turned upwards;

(e) a lock support being attached to the back wall near the upper end of the extension, with the lock support providing a support for the releasable lock and limiting inward movements of the side pins;

(f) two retaining posts being attached to the back wall and positioned adjacent to and immediately below the lock support, with the side pins being out of the holes of the adjustable leg when the finger grip is positioned between and held by the retaining posts; and (g) a base attached to the back wall at the lower end of the extension; said method comprising:

(a) moving the side pins of the releasable lock inwards and out of the corresponding hole of the adjustable leg, such that the extension is removed from registration with the adjustable leg and is slid along the adjustable leg; and (b) moving the side pins of the releasable lock outwards through the corresponding aperture of the extension and into the corresponding hole in the adjustable leg, such that the extension engages with the adjustable leg and a new height is set for the workpiece.

8. The method of applying a channel-shaped extension to adjust heights of workpieces according to claim 7, with the wish-bone shaped finger grip of the extension comprising:

(a) a top face with a central hole, with the capped screw passing through said central hole;

(b) two upper downwardly-extending surfaces that are continuations from opposite sides of the top face, with said opposite sides being parallel to the first and second side wall of the extension, with the two upper downwardly-extending surfaces being pushed in between the retaining posts when the finger grip is being turned towards the back wall and being forced out therefrom when the finger grip is being turned upwards;

(c) two intermediary faces that are continuations of the corresponding upper downwardly-extending surface and that are basically parallel to the top face; and (d) two lower downwardly-extending surfaces that are each a continuation of the corresponding intermediary face, each side pin being rigidly connected to and extending away from and in a basically perpendicular direction to the corresponding lower downwardly-extending surface of the finger grip; said method further comprising:

(a) pushing the two upper downwardly-extending surfaces in between the retaining posts when the two lower downwardly-extending surfaces and the corresponding side pins move inwards; and (b) forcing the two upper downwardly-extending surfaces out of registration between the retaining posts when the two upper downwardly-extending surfaces move back.

9. The method of applying a channel-shaped extension to adjust heights of workpieces according to claim 8, with each lower downwardly-extending surface having external edges that are not shared with the corresponding intermediary face, with one straight external edge neighboring the upper end of the extension and the remaining external edges resembling a quarter of an ellipse, said method further comprising:

(a) rolling the finger grip smoothly over the elliptical external edges of the lower downwardly-extending surfaces when the finger grip is being turned downwards towards the lower end of the extension and when the finger grip is being turned upwards towards the upper end of the extension; but (b) stopping the finger grip from rolling when each corner of intersection of the straight external edge and the remaining external edges is reached.

10. The method of applying a channel-shaped extension to adjust heights of workpieces according to claim 8, said method further comprising:

(a) retracting the finger grip and positioning the finger grip between and to be retained by the retaining posts to prevent protrusion of the side pins out of the first and second side wall of the extension; and (b) sliding the extension freely along the adjustable leg without needing any external force for preventing a contact between the side pins and the adjustable leg.

11. The method of applying a channel-shaped extension to adjust heights of workpieces according to claim 7, with the lock support of the extension comprising a supporting plate that is positioned above and attached to the back wall and a supporting dome that is positioned above and attached to the supporting plate, with any movement of the releasable lock being prevented when the tip of the capped screw rests in an empty space in the supporting dome, said method further comprising:

(a) moving the tip of the capped screw longitudinally upwards out of the supporting dome before the finger grip can be moved downwards, with the movement of the tip of the capped screw being prevented by the supporting dome when the finger grip is rigidly held between the retaining posts; and (b) moving the tip of the capped screw longitudinally downwards into the supporting dome in order to enable the registration of the extension with the adjustable leg, with an inward movement of the side pins through the apertures of the extension being limited by the supporting plate.

12. The method of applying a channel-shaped extension to adjust heights of workpieces according to claim 7, the workpiece having an adjustable leg that includes at least one pair of aligned holes, with the height of the workpiece being changed, without using any screwdrivers, pliers, wrenches or other similar appliances that are regularly used for removing, positioning or adjusting extensions, said method comprising:

(a) manually disengaging the releasable lock in order to release the attached extension from registration with the adjustable leg;

(b) removing the released extensions; and (c) engaging another extension of a different length with the adjustable leg.

13. The method of applying a channel-shaped extension to adjust heights of workpieces according to claim 7, the workpiece having an adjustable leg that includes at least two pairs of aligned holes, with the height of the workpiece being changed, without using any screwdrivers, pliers, wrenches or other similar appliances that are regularly used for removing, positioning or adjusting extensions, said method comprising:

(a) manually disengaging the releasable lock in order to release the attached extension from registration with the adjustable leg, (b) removing the released extension, and (c) engaging another extension of a different length with the adjustable leg; or (a) manually disengaging the releasable lock in order to release the attached extension from registration with a pair of aligned holes of the adjustable leg, (b) sliding the released extension along the adjustable leg, and (c) engaging the same extension into a different pair of aligned holes of the workpiece.

* * * * *